United States Patent [19]

Hashimoto

[11] 4,319,823
[45] Mar. 16, 1982

[54] ELECTROMAGNETIC DRIVING DEVICE

[75] Inventor: Teiji Hashimoto, Kawasaki, Japan

[73] Assignee: Canon Kabushiki Kaisha, Tokyo, Japan

[21] Appl. No.: 208,343

[22] Filed: Nov. 19, 1980

[30] Foreign Application Priority Data

Nov. 29, 1979 [JP] Japan .............................. 54-165325[U]

[51] Int. Cl.³ ............................................. G03B 9/08
[52] U.S. Cl. ..................................... 354/234; 310/37;
335/225; 335/272
[58] Field of Search ............... 354/234, 235, 250, 261,
354/264, 258, 271; 335/220, 224–226, 272;
310/36–38

[56] References Cited

U.S. PATENT DOCUMENTS 3,744,393  7/1973  Uchiyama et al. .................. 354/271

Primary Examiner—John Gonzales
Attorney, Agent, or Firm—Toren, McGeady & Stanger

[57] ABSTRACT

An electromagnetic driving device for driving shutter blades wherein a field coil used as stator encircles a permanent magnet rotor and extends across the rotational axis thereof. The rotor is arranged to undergo reciprocating rotation through less than one half turn in driving the shutter blades to open and close the shutter. Interference between the field coil and a coaxially arranged output shaft is avoided by the provision of a U-shaped intermediate member extending about the field coil and connecting the output shaft and the rotor.

3 Claims, 4 Drawing Figures

ELECTROMAGNETIC DRIVING DEVICE

BACKGROUND OF THE INVENTION

1. Field of the Invention:

This invention relates to an improvement in an electromagnetic device for driving the shutter of a camera.

2. Description of the Prior Art:

It has been known to use a reciprocating rotary electromagnetic drive source for electromagnetically driving shutter blades or stop blades. The known conventional drive sources used for this purpose include a moving coil type and a moving magnet type. Both types are arranged to drive shutter or stop blades by the rotation of a rotor to an extent not exceeding one half turn. However, it is preferable to use the moving magnet type since it permits simplification of the structural arrangement.

In the conventional electromagnetic drive source of the moving magnet type, an output shaft is directly attached to a magnet while a field coil is divided into two parts to avoid interference with the output shaft. Such an arrangement, however, not only makes it difficult to wind the coil but also does not give a sufficient output because of the lack of a coil in the magnetizing direction, namely on the diameter of the magnet, thus resulting in low magnetic flux density of the coil.

SUMMARY OF THE INVENTION

The present invention provides an electromagnetic driving device which eliminates the above stated shortcoming of the conventional arrangement. In accordance with the invention, a coil is arranged without being divided and, to avoid interference between the coil and an output shaft, which is arranged to be rotatively driven by a rotor at a given angular degree, there is provided an intermediate member which is arranged to extend about the coil.

In accordance with a further feature of the invention, there is provided an electromagnetic driving device which is capable of efficiently driving a shutter by balancing the weight of the intermediate member with the weight of the blades of the shutter.

These and further objects, features and advantages of the invention will be apparent from the following detailed description of a preferred embodiment thereof taken in connection with the accompanying drawings.

DETAILED DESCRIPTION OF THE PREFERRED EMBODIMENT

Figure 1:
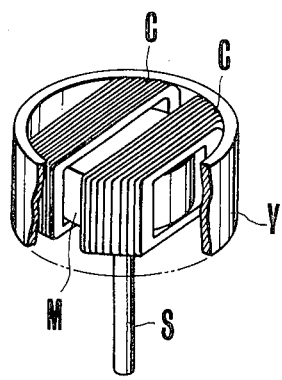
FIG. 1 is an oblique view showing the structural arrangement of a conventional electromagnetic drive source of the rotary magnet type.

In the example of the conventional electromagnetic drive source of the rotary magnet type which is shown in FIG. 1, there are provided a cylindrical permanent magnet M which serves as rotor; a yoke Y which is arranged around the rotor M; a field coil C which is secured to the inside of the yoke Y and is divided into two parts as shown; and an output shaft S which is directly secured to the center of the above stated rotor M and is arranged to extend downward between the divided two parts of the coil C. The output shaft S is supported by a bearing which is not shown.

Figure 2:
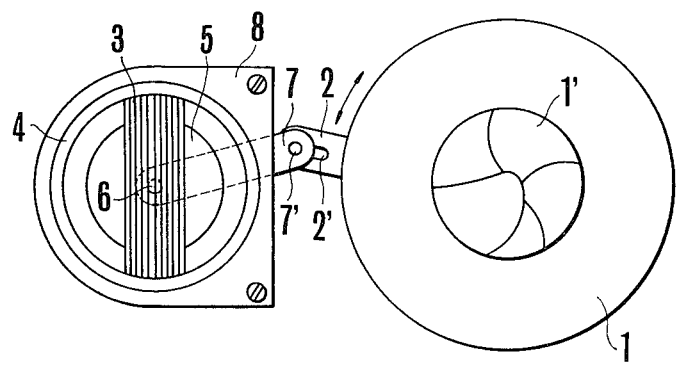
FIG. 2 is a plan view showing an electromagnetic drive source as an embodiment of the invention adapted for driving a lens shutter.
Figure 3:
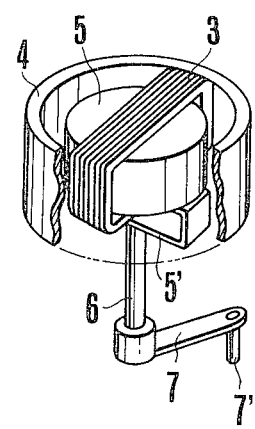
FIG. 3 is an oblique view showing the structural arrangement of the same embodiment.
Figure 4:
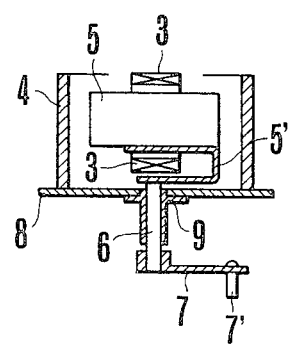
FIG. 4 is a sectional view showing the embodiment shown in FIG. 3.

FIG. 2 shows an embodiment of the present invention. In FIG. 2, there is shown a known lens shutter 1 having a plurality of shutter blades 1'. The shutter blades 1' are arranged to open or close the shutter according as a lever 2 makes reciprocating rotation in the directions indicated by arrows. The embodiment includes a yoke 4 which is secured to a base plate 8; a field coil 3 which is wound round a coil frame and is secured to the inner circumference of the above stated yoke 4, the field coil 3 being arranged to serve as stator of an electromagnetic drive source; and a rotor 5 composed of a permanent magnet which is magnetized in the direction of the diameter thereof and is provided with an output shaft 6 which is secured to the rotor 5 through an intermediate member 5' and is positioned on the center line or coaxial with the rotational axis of the rotor 5 as shown in FIGS. 3 and 4. The output shaft 6 is supported by a bearing 9 which is secured to the above stated base plate 8 in such a manner as to permit the rotor 5 to rotate inside of the coil 3. The output shaft 6 has a lever 7 secured to the lower end thereof. One end of the lever 7 has a pin 7' mounted therein. The pin 7' is fitted into a slot 2' which is provided in the above stated lever 2. The rotation of the rotor 5 is thus arranged to be transmitted to the shutter blades through this engagement of the pin 7' with the slot 2'.

The intermediate member 5' which connects the rotor 5 to the output shaft 6 is made of a plate which is formed into a U-shape and is arranged in such a way as to straddle the lower side of the coil 3. One arm part of the intermediate member 5' is secured to the rotor 5 while the other arm part thereof is secured to the output shaft 6 to transmit the rotation of the rotor 5 to the output shaft 6.

When a current is supplied to the field coil 3, the rotor is arranged to rotate, for example, 70° or thereabout in a reciprocating manner to open and close the shutter blades. The intermediate member 5' never comes into contact with the coil 3 during the reciprocating rotation of the rotor 5.

Further, with intermediate member 5' arranged in a suitable direction relative to the direction in which the lever 7 is arranged, the weight of the shutter blades and that of the intermediate member can be balanced with each other relative to the output shaft. With this balancing arrangement, an error in shutter speed due to variation in the posture of the camera can be prevented.

In this particular embodiment, the electromagnetic drive source is arranged to drive the blades of a lens shutter. However, the invention is not limited to this and is also applicable to a focal plane shutter of the metal plate type such as the one disclosed, for example, by U.S. Pat. No. 3,829,878.

As described in the foregoing, the electromagnetic drive source of the present invention which has a rotor composed of a permanent magnet is arranged to connect an output shaft to the rotor through a U-shaped intermediate member straddling one side of a field coil, so that the coil can be wound without dividing it. Compared with the conventional electromagnetic drive source, the coil not only can be easily prepared to lower the cost of manufacture but also is capable of giving a greater driving torque.

Further, the provision of the above stated intermediate member operates to easily balance the weight of the shutter blades with the intermediate member.

While a specific embodiment of the invention has been shown and described in detail to illustrate the application of the inventive principles, it will be understood that the invention may be embodied otherwise without departing from such principles.

What is claimed is:

1. An electromagnetic driving device for driving a shutter, comprising:
    a stator which is composed of a field coil;
    a rotor which is composed of a cylindrical permanent magnet and is arranged to rotate when said field coil is energized;
    an output shaft in driven engagement with said rotor; and
    an intermediate member connecting said rotor to said output shaft, said intermediate member being formed into a U-shape and positioned to extend about one side of said field coil, one side of the intermediate member being secured to said rotor and the other side thereof to said output shaft with said output shaft held in position on a line extending from the center line of the rotor.

2. An electromagnetic driving device according to claim 1, wherein said output shaft is provided with an arm which is secured to the output shaft and is arranged to have shutter blades driven therethrough; and said intermediate member is disposed in a position where it is balanced in weight with said shutter blades.

3. An electromagnetic mechanism for driving a camera shutter comprising a rotor comprising permanent magnet means arranged to be electromagnetically energized for rotation about a linear axis extending through said rotor, a rotor shaft extending coaxially with said linear axis and connected with said rotor to be rotatively driven thereby, a stator comprising an electromagnetic winding encircling said rotor and extending across said linear rotational axis, and an intermediate member bridging said winding connecting said rotor with said rotor shaft, said intermediate member having a generally U-shaped configuration extending about one side of said winding and including a first arm connected with said rotor and another arm connected with said rotor shaft to enable said rotor shaft to be driven by said rotor coaxially with said linear rotational axis without interference from said winding.

* * * * *